United States Patent [19]

McClish et al.

[11] Patent Number: 4,850,396

[45] Date of Patent: Jul. 25, 1989

[54] HOSE WIRE RETAINER

[75] Inventors: Arthur W. McClish, Columbia City; Kevin D. Richards, South Whitley, both of Ind.

[73] Assignee: Dana Corporation, Toledo, Ohio

[21] Appl. No.: 256,203

[22] Filed: Oct. 7, 1988

Related U.S. Application Data

[63] Continuation of Ser. No. 84,236, Aug. 10, 1987, abandoned.

[51] Int. Cl.⁴ .................... F16L 11/12; F16L 55/00
[52] U.S. Cl. ............................. 138/103; 138/172; 174/47
[58] Field of Search ............ 138/103, 110, 177, 178, 138/106, 107, 172; 174/47, DIG. 8; 24/457, 570

[56] References Cited

U.S. PATENT DOCUMENTS

| | | | |
|---|---|---|---|
| 3,286,963 | 11/1966 | Bergman | 24/457 X |
| 3,885,742 | 5/1975 | Menzel | 24/570 X |
| 3,920,786 | 11/1975 | Brunelle et al. | 264/251 |
| 3,961,647 | 6/1976 | Doubleday | 174/47 X |
| 3,992,565 | 11/1976 | Gatfield | 174/47 X |
| 4,522,114 | 6/1985 | Matsumo | 138/103 X |
| 4,585,036 | 9/1986 | Jartoux | 138/103 X |

FOREIGN PATENT DOCUMENTS

| | | | |
|---|---|---|---|
| 524909 | 5/1956 | Canada | 174/47 |
| 560916 | 4/1957 | Italy | 174/47 |
| 323095 | 7/1957 | Switzerland | 174/47 |

Primary Examiner—James E. Bryant, III
Attorney, Agent, or Firm—F. B. McDonald

[57] ABSTRACT

A system of wire connectors fixedly secured to a tubular hydraulic brake hose member in a vehicular assembly. In a preferred form, the connectors are uniformly spaced along the tubular member, each connector having a main body portion injection molded to the tubular member. Each connector has a pair of flexible retaining tabs spaced circumferentially apart from one another and extending generally radially of the main body portion. Each pair of tabs defines a generally circular wire receiving opening of a diameter substantially equal to that of the wire member intended to be secured therein. The tabs further define a pair of flexible arms which provide snap-fittable engagement and removal of the wire member with respect to the opening.

3 Claims, 1 Drawing Sheet

HOSE WIRE RETAINER

This application is a continuation of Ser. No. 084236, filed 8/10/87, now abandoned.

BACKGROUND OF THE INVENTION

This invention relates to securement of elongated members to one another at selected attachment points along their lengths. More particularly, the invention relates to the use of connective devices or connectors providing securement of wires to tubular members.

Numerous connective devices have been employed as attachments between elongated members. In the hydraulic brake hose art, however, the connective devices have typically been made of metal as opposed to plastics or other materials which are resistant to corrosion and impervious to moisture. Ideally, such connective devices would be made of materials not affected by the corrosion and moisture encountered in automotive environments.

In addition, many prior art connectors are relatively cumbersome to manufacture and install. As such, a simple and relatively inexpensive connector made of a material unaffected by moisture and resistant to corrosion would be a welcomed advance in this art.

SUMMARY OF THE INVENTION

The wire connector of the present invention provides an inexpensive means for retaining an elongated flexible member, such as a brake wear sensor wire, in position adjacent larger tubular member, such as a brake hose, for providing routing of the wire along the hose in an automotive vehicle. The connector is preferably injection molded to the brake hose, and a plurality of such connectors are spaced along the hose body in order to secure the wire in a position adjacent the hose.

Each connector defines a main body portion and a pair of flexible retaining tabs, each tab spaced circumferentially apart from the other, and extending generally radially of the main body portion. Each pair of tabs defines a generally circular wire receiving opening having a diameter substantially equal to the wire member intended to be secured therein. Also in the preferred form, the hose comprises a longitudinally serrated exterior body surface which enhances securement of the connectors to the hose at their main body portions. The plurality of spaced connectors are positioned such that all of the tabs are aligned in a parallel manner to provide a convenient snap-fittable engagement and removal mechanism for the wire.

DETAILED DESCRIPTION OF A PREFERRED EMBODIMENT

Figure 1:
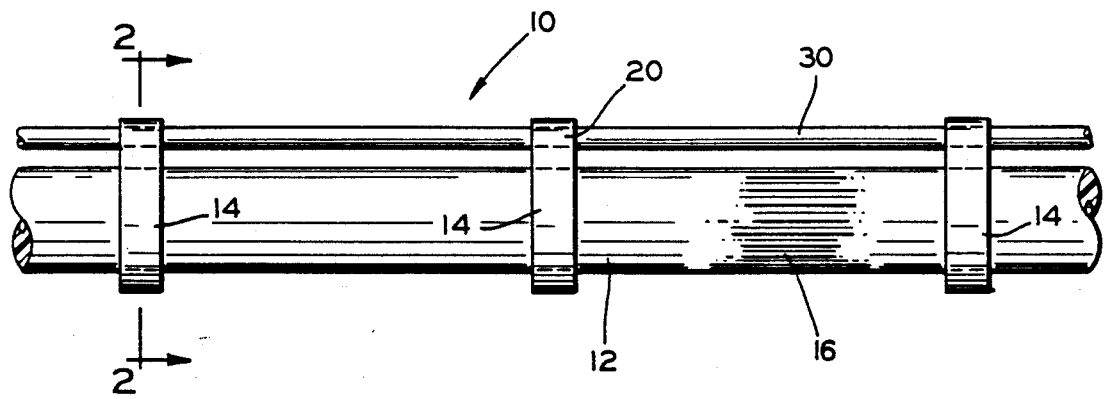
FIG. 1 is a side view of a fragmentary portion of a hydraulic brake hose assembly, showing a plurality of wire connectors constructed in accordance with the present invention, wherein the connectors are adapted to support a wire adjacent the hose.
Figure 2:
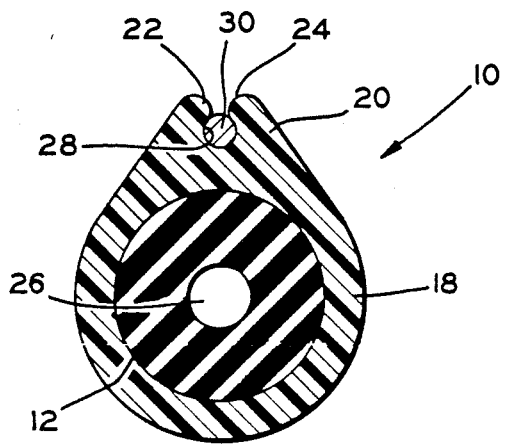
FIG. 2 is a cross-sectional view taken along lines 2—2 of FIG. 1.

Referring to the drawings, a hydraulic brake hose assembly 10 includes a tubular member 12, such as a brake hose, formed of an elastomer material suitable for conveyance of hydraulic brake fluid through a passageway 26 (FIG. 2). A plurality of wire connectors 14 are uniformly spaced along the tubular member 12 (FIG. 1), each connector being molded to the member 12 preferably by an injection molding process, wherein upon subsequent cooling a main body portion 18 of each connector becomes shrink fitted about the member 12. Securement of the connectors 14 to the tubular member 12 is enhanced by the use of a serrated exterior body surface as shown only partially at 16 on the member 12.

The main body portion 18 of each connector 14 is molded directly to the exterior serrated body surface 16 of the member 12 as described. However, each connector 14 also incorporates an upper body portion 20 which extends radially of the main body portion and includes a pair of integral circumferentially spaced retainer tabs, 22 and 24, (FIG. 2). The tabs 22 and 24 together define an opening 28 suitably adapted to support and retain a wire member 30, such as a brake wear sensor wire, along the length of the tubular member 12. For this purpose, the opening 28 in the preferred form is substantially of the same diameter as the wire member 30 intended to be supported by and retained therein.

In addition, the integral retainer tabs 22 and 24 define a pair of flexible arms which provides a mechanism for snap-fittable engagement and removal of the wire member 30 relative to the opening 28. Hence, radially outwardly of the opening 28, it will be seen that the resilient extremities of the tabs 22 and 24 are circumferentially spaced more closely together than at the diameter of the opening 28. To the extent that the tabs 22 and 24 are integral parts of the connector 14, it will be appreciated by those skilled in the art that use of a plastic material will afford the resiliency necessary for snap-fittable engagement and removal of the wire member 30.

Also in the preferred form, the opening 28 is sized to permit at least some limited axial movement of the wire member 30 in a direction parallel to the elongated tubular member 12, as the latter is twisted, turned or flexed during installation. It will also be seen, however, that the tabs will operate to restrain the wire member from radial dislodgement relative to the tubular member 12.

As previously noted, the serrated body surface 16 enhances the securement of the connectors 14 to the tubular member 12. Thus, to the extent that the tubular member comprises longitudinal serrations, the hose engaging main body portion 18 (FIG. 2) of the connectors 14 will incorporate an inner surface having correspondingly engaging portions extending into spaces defined by the longitudinal serrations of the tubular member 12. In the preferred form, the plurality of connectors 14 are arranged so as to insure that the respective pairs of tabs 22 and 24 are circumferentially aligned in a parallel arrangement along the length of the tubular member 12 as shown in FIG. 1 for convenience of installation and removal of the wire member 30.

Although only one preferred embodiment of the invention has been detailed and described herein, the following claims are envisioned to cover numerous other embodiments not particularly described.

What is claimed is:

1. An apparatus comprising a flexible, elastomer tubular member and a plurality of wire connectors fixed to said flexible, elastomer tubular member, said connectors spaced apart along said member and comprising resilient means for selectively securing a wire member adjacent said tubular member, each of said connectors comprising an annular main body portion fixedly molded about said tubular member, said connectors each comprising a pair of flexible retaining tabs, said tabs spaced apart from one another and extending generally radially of said annular main body portion and defining a generally circular wire receiving opening therebetween, said opening having a diameter substantially equal to that of the wire member intended to be secured therein, said opening size to permit limited axial movement of said wire member as said elastomer tubular member is twisted, turned or flexed, wherein said tabs are comprised of a plastic material and are integral to said annular main body portion, and wherein said tubular member comprises a longitudinally serrated exterior body surface, wherein said main body portion includes an inner surface having portions extending into and engaging spaced defined by said exterior longitudinal serrations of said tubular member.

2. The apparatus of claim 1 wherein said main body portion is shrink fitted about said tubular member.

3. The apparatus of claim 2 wherein said main body portion comprises an injection molded plastic, wherein said integral tabs comprise a pair of flexible arms disposed for snap-fittable engagement and removal of said wire member.

* * * * *